United States Patent
Tang et al.

(10) Patent No.: US 9,695,333 B2
(45) Date of Patent: Jul. 4, 2017

(54) RESIN COMPOSITION AND COATING MATERIAL USING THE SAME

(71) Applicant: INDUSTRIAL TECHNOLOGY RESEARCH INSTITUTE, Hsinchu (TW)

(72) Inventors: Wei-Cheng Tang, Hsinchu (TW); Su-Mei Chen Wei, Hsinchu (TW); Yi-Che Su, Zhubei (TW); Ya-I Hsu, Taoyuan (TW); Yi-Tzu Peng, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/807,603

(22) Filed: Jul. 23, 2015

(65) Prior Publication Data

US 2016/0185895 A1    Jun. 30, 2016

(30) Foreign Application Priority Data

Dec. 31, 2014 (TW) .............................. 103146450 A

(51) Int. Cl.
C08L 63/00    (2006.01)
C08L 67/00    (2006.01)
C09D 163/00   (2006.01)
C08G 59/32    (2006.01)
C08G 59/42    (2006.01)

(52) U.S. Cl.
CPC ........... C09D 163/00 (2013.01); C08G 59/32 (2013.01); C08G 59/4215 (2013.01); C08G 59/4276 (2013.01)

(58) Field of Classification Search
CPC .. C09D 163/00; C08G 59/32; C08G 59/4215; C08G 59/4276
USPC .......................... 523/400; 525/418, 523, 533
See application file for complete search history.

(56) References Cited

U.S. PATENT DOCUMENTS

| | | | |
|---|---|---|---|
| 3,641,194 A * | 2/1972 | Schmid .................. | C08G 63/16 525/438 |
| 4,259,198 A * | 3/1981 | Kreibich ................ | C08L 63/00 126/400 |
| 4,722,990 A | 2/1988 | Koenig et al. | |
| 5,252,637 A | 10/1993 | Craun et al. | |
| 5,427,857 A | 6/1995 | Peng | |
| 5,447,974 A | 9/1995 | Peng | |
| 5,508,325 A | 4/1996 | Craun et al. | |
| 5,726,249 A | 3/1998 | Barsotti et al. | |
| 5,777,045 A * | 7/1998 | Carr ....................... | C08G 59/12 525/438 |
| 6,146,703 A | 11/2000 | Barsotti et al. | |
| 6,992,133 B2 | 1/2006 | Yokoyama et al. | |
| 7,037,584 B2 | 5/2006 | Wind et al. | |
| 8,147,036 B2 | 4/2012 | Tsuji | |
| 2009/0076218 A1 | 3/2009 | Zhao et al. | |
| 2014/0088269 A1* | 3/2014 | Dufrancatel .......... | C08G 63/91 525/444 |

FOREIGN PATENT DOCUMENTS

| | | | | |
|---|---|---|---|---|
| CN | 1550892 A | 12/2004 | | |
| CN | 101475683 A | 7/2009 | | |
| CN | 101475685 A | 7/2009 | | |
| CN | 101939361 A | 1/2011 | | |
| CN | 102089347 A | 6/2011 | | |
| CN | 101851396 B | 5/2012 | | |
| CN | 103403052 A | 11/2013 | | |
| CN | 103497316 A | 1/2014 | | |
| CN | 103502354 A | 1/2014 | | |
| CN | 104039902 A | 9/2014 | | |
| FR | 2967161 A1 * | 5/2012 | ............. | C08G 63/91 |
| TW | 200724619 A | 7/2007 | | |
| TW | 200914552 A | 4/2009 | | |
| TW | 200946568 A | 11/2009 | | |
| WO | WO 2013/170313 A1 | 11/2013 | | |

OTHER PUBLICATIONS

Burkhart et al., "Epoxy-Amine Resins with Controlled Reactivity", Macromolecular Chemistry and Physics, 2014, vol. 215, pp. 421-425.
Carrasco et al., "Improvement of the thermal stability of branched poly(lactic acid) obtained by reactive extrusion", Polymer Degradation and Stability, 2014, vol. 104, pp. 40-49.
Gao et al., "Hyperbranched polymers: from synthesis to applications", Progress in Polymer Science, 2004, vol. 29, pp. 183-275.
Qiang et al., "The dielectric behavior and origin of high-k composites with very low percolation threshold based on unique multi-branched polyaniline/carbon nanotube hybrids and epoxy resin", Composites: Part A, 2014, vol. 64, pp. 1-10.
Schaubroeck et al., "Surface modification of an epoxy resin with polyamines and polydopamine: The effect on the initial electroless copper deposition", Applied Surface Science, 2014, vol. 305, pp. 321-329.

* cited by examiner

*Primary Examiner* — David Karst
(74) *Attorney, Agent, or Firm* — Birch, Stewart, Kolasch & Birch, LLP

(57) ABSTRACT

A resin composition formed by reacting a polyester-polyacid oligomer with a poly-epoxy oligomer is provided. The functionality of the resin composition is between 4 and 10. The weight average molecular weight of the resin composition is between 3,000 and 20,000 g/mol.

16 Claims, No Drawings

RESIN COMPOSITION AND COATING MATERIAL USING THE SAME

This application claims the benefit of Taiwan application Serial No. 103146450, filed Dec. 31, 2014, the disclosure of which is incorporated by reference herein in its entirety.

TECHNICAL FIELD

The disclosure relates in general to a resin composition and a coating material using the same, and more particularly to a resin composition having branched structure and a coating material having less volatile organic compound (VOC) using the same.

BACKGROUND

Compared to the general architectural coating material, the industrial coating material is often exposed to harsh outdoor environments, suffers from ultraviolet (UV), high temperature and mechanical force damage, so that higher heat-resistant and adhesion of the industrial coating material are needed. Therefore, the resin used to form the coating material often has higher molecular weight to satisfy these conditions. When the resin has higher molecular weight, the heat-resistant and adhesion of the coating film formed by the synthetic coating material may be enhanced more.

However, since traditional resin has linear structure and high crystallinity, the resin would be semi-solid or solid when the weight average molecular weight of the resin is larger than 700 g/mol, such that a large number of volatile organic solvents would be added and the content of the volatile organic compound is much higher. Under double issues of the Green Chemistry and environment-friendly, it is the positive target in the coating industry to reduce the content of volatile organic compound of coating materials.

SUMMARY

The disclosure relates in general to a resin composition and a coating material using the same, which reduces the crystallinity of the polymer by the branched structure, such that the resin composition may be maintained as flowable liquid when the weight average molecular weight of the resin composition is larger than 3,000 g/mol. Therefore, the amount of the volatile organic solvents may be reduced when producing the coating material.

According to one embodiment, a resin composition formed by reacting a polyester-polyacid oligomer with a poly-epoxy oligomer is provided. The functionality of the resin composition is between 4 and 10. The weight average molecular weight of the resin composition is between 3,000 and 20,000 g/mol.

According to another embodiment, a coating material including a 1 to 20 wt % curing agent and a 1 to 80 wt % resin composition is provided. The resin composition is formed by reacting a polyester-polyacid oligomer with a poly-epoxy oligomer. The functionality of the resin composition is between 4 and 10. The weight average molecular weight of the resin composition is between 3,000 and 20,000 g/mol.

BRIEF DESCRIPTION OF THE DRAWINGS (none)

In the following detailed description, for purposes of explanation, numerous specific details are set forth in order to provide a thorough understanding of the disclosed embodiments. It will be apparent, however, that one or more embodiments may be practiced without these specific details.

DETAILED DESCRIPTION

The resin composition in the embodiment according to the disclosure may be formed by reacting a polyester-polyacid oligomer with a poly-epoxy oligomer. In the embodiment, the functionality of the resin composition may be between 4 and 10, and the weight average molecular weight of the resin composition may be between 3,000 and 20,000 g/mol.

In the embodiment according to the disclosure, the polyester-polyacid oligomer is formed by reacting a diol, a triol or the combination thereof with an anhydride. In one embodiment, the diol or the triol may be selected from the group consisting of ethylene glycol, 1,3-propanediol, neopentyl glycol, 1,4-cyclohexanedimethanol, glycerol, and the combination thereof. For example, the diol or the triol may include the structure represented by the following chemical formula:

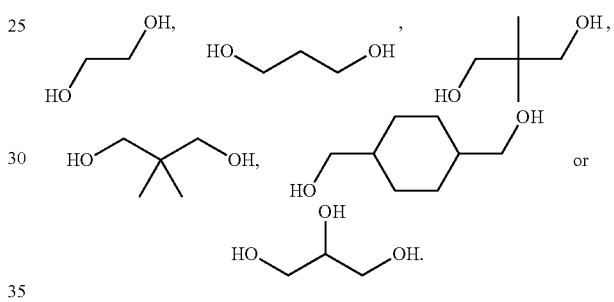

The anhydride may be selected from the group consisting of maleic anhydride, phthalic anhydride, 1,2,4-trimethyl cyclohexane anhydride, pyromellitic dianhydride, and the combination thereof.

In one embodiment, a diol may be reacted with an anhydride (such as

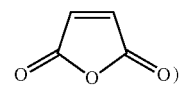)

to form a polyester-polyacid oligomer. Here, the weight average molecular weight of the polyester-polyacid oligomer may be such as between 300 and 850 g/mol.

Then, the foregoing polyester-polyacid oligomer is reacted with a poly-epoxy oligomer to form the resin composition in the embodiment according to the disclosure. In one embodiment, the poly-epoxy oligomer may be selected from the group consisting of trimethylolpropane triglycidyl ether, trimethylolethane triglycidyl ether, glycerol propoxylate triglycidyl ether, 4,4'-Methylenebis (N,N-diglycidylaniline), and the combination thereof.

For example, the foregoing polyester-polyacid oligomer may be reacted with a poly-epoxy oligomer (such as tri-epoxy oligomer) to form the resin composition in the embodiment according to the disclosure. Here, the weight average molecular weight of the poly-epoxy oligomer may be such as between 250 and 700 g/mol.

In the embodiment according to the disclosure, the resin composition may be represented by the chemical formula ($C_xH_yO_z)_n$, where x may be such as between 38 and 87, y may be such as between 50 and 138, z may be such as between 23 and 141, and n may be such as between 2 and 38. Further, the viscosity of the resin composition in the embodiment according to the disclosure may be between 2,000 and 70,000 cps.

Furthermore, the functionality of the resin composition may be the epoxy group number of the resin composition in the embodiment according to the disclosure. That is, each molecule of the composition in the embodiment according to the disclosure may include 4 to 10 epoxy groups. Since the resin composition in the embodiment according to the disclosure may be formed by reacting a polyester-polyacid oligomer with a poly-epoxy oligomer, the functionality of the resin composition may be limited in a specific range, so as to prevent from the large number of functionality of the high molecular weight product (hyperbranched product) formed by small molecules in the traditional process which may lead to film-shrinking and would not be applied as coating materials.

The following Example 1 to Example 5 are described to show the processes of manufacturing the resin composition according to the disclosure. It should be noted that Example 1 to Example 5 are described to show different ways to form the resin composition, not to limit the disclosure. Meanwhile, Comparative Example 1 and Comparative Example 2 are also described to compare with the examples in the disclosure.

EXAMPLE 1

30 g of cyclohexanedimethanol (CHDM) and 0.7 g triphenyl phosphate were mixed and heated to 130° C. After the mixture was melt into liquid, 40.80 g of maleic anhydride (MA) was added and the reaction was kept for 5 hours to obtain the polyester-polyacid oligomer. Here, the weight average molecular weight of the polyester-polyacid oligomer may be about 788 g/mol. Then, the reaction temperature was reduced to 90° C., and 415.03 g of propoxylated glycerol triglycidyl ether (ERISYSTM GE-36, made by Heng Hsin Co., Ltd. Chemical formula:

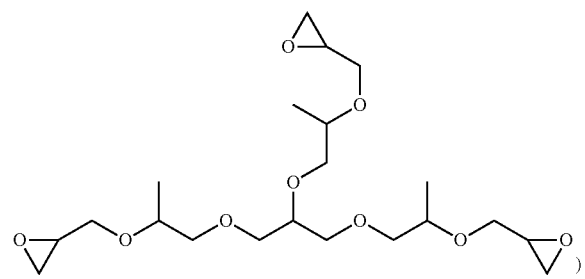 [SMILES: CC(COCC(COCC(C)OCC1CO1)OCC(C)OCC1CO1)OCC1CO1]

(the weight average molecular weight may be about 435 g/mol) was added. The reaction temperature was heated to 130° C. and the reaction was kept for 2 hours to obtain the branched high molecular weight and liquid epoxy resin composition.

In this example, the weight average molecular weight (Mw) of the branched high molecular weight and liquid epoxy resin composition may be 11,519 g/mol, the epoxy equivalent weight (EEW) of the branched high molecular weight and liquid epoxy resin composition may be 1,504 g/eq, epoxy functionality (Mw/EEW) of the branched high molecular weight and liquid epoxy resin composition may be 7.7, the viscosity of the branched high molecular weight and liquid epoxy resin composition may be 68,440 cps, and the weight loss of the branched high molecular weight and liquid epoxy resin composition tested in the thermogravimetric analyzer (TGA) under 250° C. may be 5.53%.

EXAMPLE 2

30 g of neopentyl glycol (NPG) and 0.8 g triphenyl phosphate were mixed and heated to 130° C. After the mixture was melt into liquid, 56.49 g of maleic anhydride (MA) was added and the reaction was kept for 5 hours to obtain the polyester-polyacid oligomer. Here, the weight average molecular weight of the polyester-polyacid oligomer may be about 573 g/mol. Then, the reaction temperature was reduced to 90° C., and 574.6 g of propoxylated glycerol triglycidyl ether (ERISYSTM GE-36) was added. The reaction temperature was heated to 130° C. and the reaction was kept for 3 hours to obtain the branched high molecular weight and liquid epoxy resin composition.

In this example, the weight average molecular weight (Mw) of the branched high molecular weight and liquid epoxy resin composition may be 15,930 g/mol, the epoxy equivalent weight (EEW) of the branched high molecular weight and liquid epoxy resin composition may be 1,732 g/eq, epoxy functionality (Mw/EEW) of the branched high molecular weight and liquid epoxy resin composition may be 9.2, the viscosity of the branched high molecular weight and liquid epoxy resin composition may be 29,300 cps, and the weight loss of the branched high molecular weight and liquid epoxy resin composition tested in the thermogravimetric analyzer (TGA) under 250° C. may be 4.59%.

EXAMPLE 3

30 g of ethylene glycol (EG) and 1.24 g triphenyl phosphate were mixed and heated to 130° C. After the mixture was melt into liquid, 94.78 g of maleic anhydride (MA) was added and the reaction was kept for 5 hours to obtain the polyester-polyacid oligomer. Here, the weight average molecular weight of the polyester-polyacid oligomer may be about 324 g/mol. Then, the reaction temperature was reduced to 90° C., and 964.03 g of propoxylated glycerol triglycidyl ether (ERISYSTM GE-36) and 2.2 g of antioxidant (Tetrakis methylene (3,5-di-tert-butyl-4-hydroxyl propionate) Methane, NYNOX-1010, made by Nan Ya Plastics Corporation, Chemical formula:

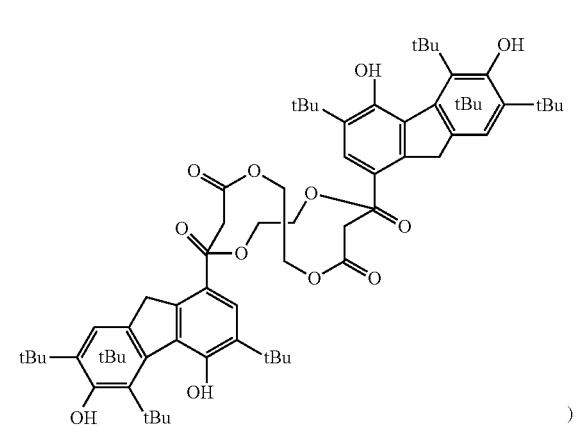

were added. The reaction temperature was heated to 130° C. and the reaction was kept for 5 hours to obtain the branched high molecular weight and liquid epoxy resin composition.

In this example, the weight average molecular weight (Mw) of the branched high molecular weight and liquid epoxy resin composition may be 6,343 g/mol, the epoxy equivalent weight (EEW) of the branched high molecular weight and liquid epoxy resin composition may be 1,098 g/eq, epoxy functionality (Mw/EEW) of the branched high molecular weight and liquid epoxy resin composition may be 5.8, the viscosity of the branched high molecular weight and liquid epoxy resin composition may be 2,634 cps, and the weight loss of the branched high molecular weight and liquid epoxy resin composition tested in the thermogravimetric analyzer (TGA) under 250° C. may be 3.58%.

EXAMPLE 4

30 g of cyclohexanedimethanol (CHDM) and 0.7 g triphenyl phosphate were mixed and heated to 130° C. After the mixture was melt into liquid, 40.80 g of maleic anhydride (MA) was added and the reaction was kept for 5 hours to obtain the polyester-polyacid oligomer. Here, the weight average molecular weight of the polyester-polyacid oligomer may be about 804 g/mol. Then, the reaction temperature was reduced to 90° C., and 415.03 g of propoxylated glycerol triglycidyl ether (ERISYSTM GE-36) was added. The reaction temperature was heated to 130° C. and the reaction was kept for 1 hour to obtain the branched high molecular weight and liquid epoxy resin composition.

In this example, the weight average molecular weight (Mw) of the branched high molecular weight and liquid epoxy resin composition may be 7,344 g/mol, the epoxy equivalent weight (EEW) of the branched high molecular weight and liquid epoxy resin composition may be 1,382 g/eq, epoxy functionality (Mw/EEW) of the branched high molecular weight and liquid epoxy resin composition may be 5.3, the viscosity of the branched high molecular weight and liquid epoxy resin composition may be 3,018 cps, and the weight loss of the branched high molecular weight and liquid epoxy resin composition tested in the thermogravimetric analyzer (TGA) under 250° C. may be 2.99%.

EXAMPLE 5

30 g of neopentyl glycol (NPG) and 0.8 g triphenyl phosphate were mixed and heated to 130° C. After the mixture was melt into liquid, 56.49 g of maleic anhydride (MA) was added and the reaction was kept for 5 hours to obtain the polyester-polyacid oligomer. Here, the weight average molecular weight of the polyester-polyacid oligomer may be about 573 g/mol. Then, the reaction temperature was reduced to 90° C., and 574.6 g of propoxylated glycerol triglycidyl ether (ERISYSTM GE-36) was added. The reaction temperature was heated to 130° C. and the reaction was kept for 1.5 hours to obtain the branched high molecular weight and liquid epoxy resin composition.

In this example, the weight average molecular weight (Mw) of the branched high molecular weight and liquid epoxy resin composition may be 9,463 g/mol, the epoxy equivalent weight (EEW) of the branched high molecular weight and liquid epoxy resin composition may be 1,461 g/eq, epoxy functionality (Mw/EEW) of the branched high molecular weight and liquid epoxy resin composition may be 6.5, the viscosity of the branched high molecular weight and liquid epoxy resin composition may be 2,919 cps, and the weight loss of the branched high molecular weight and liquid epoxy resin composition tested in the thermogravimetric analyzer (TGA) under 250° C. may be 6.4%.

COMPARATIVE EXAMPLE 1

30 g of cyclohexanedimethanol (CHDM) and 0.7 g triphenyl phosphate were mixed and heated to 130° C. After the mixture was melt into liquid, 40.80 g of maleic anhydride (MA) was added and the reaction was kept for 5 hours to obtain the polyester-polyacid oligomer. Here, the weight average molecular weight of the polyester-polyacid oligomer may be about 788 g/mol. Then, the reaction temperature was reduced to 90° C., and 415.03 g of propoxylated glycerol triglycidyl ether (ERISYSTM GE-36) was added. The reaction temperature was heated to 130° C. and the reaction was kept for 5 hours to obtain the branched high molecular weight and liquid epoxy resin composition.

In this comparative example, the weight average molecular weight (Mw) of the branched high molecular weight and liquid epoxy resin composition may be 32,655 g/mol, the epoxy equivalent weight (EEW) of the branched high molecular weight and liquid epoxy resin composition may be 1,882 g/eq, epoxy functionality (Mw/EEW) of the branched high molecular weight and liquid epoxy resin composition may be 17.4, and the product was semi-solid.

COMPARATIVE EXAMPLE 2

30 g of neopentyl glycol (NPG) and 0.8 g triphenyl phosphate were mixed and heated to 130° C. After the mixture was melt into liquid, 56.49 g of maleic anhydride (MA) was added and the reaction was kept for 5 hours to obtain the polyester-polyacid oligomer. Here, the weight average molecular weight of the polyester-polyacid oligomer may be about 565 g/mol. Then, the reaction temperature was reduced to 90° C., and 574.6 g of propoxylated glycerol triglycidyl ether (ERISYSTM GE-36) was added. The reaction temperature was heated to 130° C. and the reaction was kept for 5 hours to obtain the branched high molecular weight and liquid epoxy resin composition.

In this comparative example, the weight average molecular weight (Mw) of the branched high molecular weight and liquid epoxy resin composition may be 24,116 g/mol, the epoxy equivalent weight (EEW) of the branched high molecular weight and liquid epoxy resin composition may be 1,670 g/eq, epoxy functionality (Mw/EEW) of the branched high molecular weight and liquid epoxy resin composition may be 14.4, and the product was semi-solid.

After forming the resin composition, the coating material may be made by the resin composition. In the embodiment according to the disclosure, the coating material may include a curing agent and a resin composition. The curing agent may be, for example, a crosslinking agent, and the content of the curing agent may be 1 to 20 wt %. The resin composition may be formed by reacting a polyester-polyacid oligomer with a poly-epoxy oligomer. The functionality of the resin composition is between 4 and 10, and the weight average molecular weight of the resin composition is between 3,000 and 20,000 g/mol. In the coating material of the embodiment according to the disclosure, the content of the resin composition may be 1 to 80 wt %. For example, the resin composition may be the resin composition mentioned in the foregoing examples (such as the resin composition made by the process in Example 1 to Example 5), but the disclosure is not limited thereto.

In one embodiment, the coating material may further include a diluent and an organic solvent. The content of the diluent may be such as 10 to 40 wt %, and the content of the organic solvent may be 0 to 30 wt %. In the coating material of the embodiment according to the disclosure, the content of the volatile organic compound (VOC) is less than 300 g/L. Besides, the coating material may be coated on a substrate and cured to form a coating film at room temperature. The pull-off strength between the coating film and the substrate may be between 210 and 500 psi.

The following Example 6 to Example 12 are described to show the processes to form the coating material according to the disclosure. It should be noted that Example 6 to Example 12 are described to show different processes to form the coating material, not to limit the disclosure. Meanwhile, Comparative Example 3 to Comparative Example 6 are also described to compare with the examples in the disclosure. The method for forming the coating material includes that the resin is added to the diluent, leveling agent, antifoaming agent and crosslinking agent, and stirred uniformly, and then the mixture is sprayed.

EXAMPLE 6

The coating material in Example 6 of the disclosure includes 5 g of the resin composition in Example 2, 10 g of BE-188, 6.5 g of diluent ERISYSTM GE-24, 3.5 g of diluent ERISYSTM GE-25, and 7.85 g of crosslinking agent Ancamide® 2636. In this example, the content of the volatile organic compound (VOC) was 51.3 g/L.

Here, BE-188 was made by ChangChun Plastics. Co. Ltd. (Chemical formula:

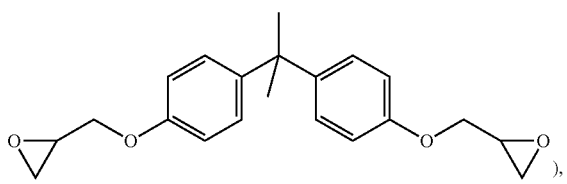 [SMILES: CC(C)(c1ccc(OCC2CO2)cc1)c1ccc(OCC2CO2)cc1]

),

ERISYSTM GE-24 and GE-25 were made by Heng Hsin Co., Ltd. (Chemical formula of GE-24:

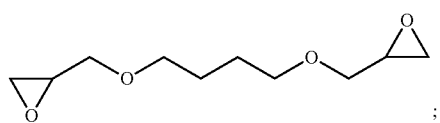 [SMILES: C(CCOCC1CO1)COCC1CO1]

;

Chemical formula of GE-25:

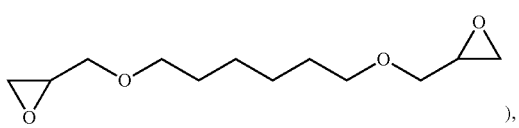 [SMILES: C(CCCOCC1CO1)CCOCC1CO1]

), and Ancamide® 2636 was made by Ya Chung Industrial Co., Ltd.

EXAMPLE 7

The coating material in Example 7 of the disclosure includes 5 g of the resin composition in Example 3, 10 g of BE-188, 6.5 g of diluent ERISYSTM GE-24, 3.5 g of diluent ERISYSTM GE-25, and 7.99 g of crosslinking agent Ancamide® 2636. In this example, the content of the VOC was 55.8 g/L.

EXAMPLE 8

The coating material in Example 8 of the disclosure includes 5 g of the resin composition in Example 4, 10 g of BE-188, 3.7 g of xylene, 6.5 g of diluent ERISYSTM GE-24, 3.5 g of diluent ERISYSTM GE-25, and 7.88 g of crosslinking agent Ancamide® 2636. In this example, the content of the VOC was 163.8 g/L.

EXAMPLE 9

The coating material in Example 9 of the disclosure includes 5 g of the resin composition in Example 4, 10 g of BE-188, 6.5 g of diluent ERISYSTM GE-24, 3.5 g of diluent ERISYSTM GE-25, and 7.88 g of crosslinking agent Ancamide® 2636. In this example, the content of the VOC was 42.0 g/L.

EXAMPLE 10

The coating material in Example 10 of the disclosure includes 5 g of the resin composition in Example 4, 10 g of BE-188, 8 g of xylene, 6.5 g of diluent ERISYSTM GE-24, 3.5 g of diluent ERISYSTM GE-25, and 7.88 g of crosslinking agent Ancamide® 2636. In this example, the content of the VOC was 282.7 g/L.

EXAMPLE 11

The coating material in Example 11 of the disclosure includes 5 g of the resin composition in Example 5, 10 g of BE-188, 6.5 g of diluent ERISYSTM GE-24, 3.5 g of diluent ERISYSTM GE-25, and 7.85 g of crosslinking agent Ancamide® 2636. In this example, the content of the VOC was 298.2 g/L.

EXAMPLE 12

The coating material in Example 12 of the disclosure includes 10 g of the resin composition in Example 4, 7.5 g of diluent ERISYSTM GE-25, and 5 g of crosslinking agent Ancamide® 2636. In this example, the content of the VOC was 22.8 g/L.

Here, the resin compositions in Comparative Example 1 and Comparative Example 2 were also tried to be used for forming the coating material. However, since the resin compositions in Comparative Example 1 and Comparative Example 2 have been cured in the manufacturing process, these resin compositions would not be applied to form the coating material.

COMPARATIVE EXAMPLE 3

The coating material in Comparative Example 3 includes 15 g of E-188, 6.5 g of diluent ERISYSTM GE-24, 3.5 g of diluent ERISYSTM GE-25, and 9.71 g of crosslinking agent Ancamide® 2636. In this comparative example, the branched high molecular weight and liquid epoxy resin compositions of Example 1 to Example 5 were not used, the content of the VOC was 110.3 g/L, and the pull-off strength was only 131 psi.

COMPARATIVE EXAMPLE 4

The coating material in Comparative Example 4 includes 15 g of E-188, 8 g of xylene, 6.5 g of diluent ERISYSTM GE-24, 3.5 g of diluent ERISYST™ GE-25, and 9.71 g of crosslinking agent Ancamide® 2636. In this comparative example, the branched high molecular weight and liquid epoxy resin compositions of Example 1 to Example 5 were not used, the content of the VOC was 278.5 g/L, and the pull-off strength was only 206 psi.

COMPARATIVE EXAMPLE 5

The coating material in Comparative Example 5 was the coating material EP-03 made by Yung Chi Paint & Varnish Mfg. Co., Ltd. The main component of the coating material EP-03 was solid, straight-chain epoxy resin, which needs a large amount of solvents for forming the coating material. The content of the VOC was 642.5 g/L.

COMPARATIVE EXAMPLE 6

The coating material in Comparative Example 6 was the coating material 1020 made by Yung Chi Paint & Varnish Mfg. Co., Ltd. The main component of the coating material 1020 was solid, straight-chain epoxy resin, which needs a large amount of solvents for forming the coating material. The content of the VOC was 402.5 g/L.

Then, the coating materials in the foregoing examples and comparative examples were coated on a substrate, and the pull-off strength test and the volatile organic compound (VOC) test were carried out. The pull-off strength test was carried out according to ASTM D-4541 Standard Test. The VOC test was carried out according to ISO11890-2 Standard Test. The results of the pull-off strength and the content of the VOC of the coating materials in the foregoing examples and comparative exampled were summarized in Table 1.

TABLE 1

|  | content of volatile organic compound (VOC) (g/L) | pull-off strength (psi) |
| --- | --- | --- |
| Example 6 | 51.3 | 347 |
| Example 7 | 55.8 | 386 |
| Example 8 | 163.8 | 272 |
| Example 9 | 42.0 | 435 |
| Example 10 | 282.7 | 276 |
| Example 11 | 298.2 | 292 |
| Example 12 | 22.8 | 367 |
| Comparative Example 3 | 110.3 | 131 |
| Comparative Example 4 | 278.5 | 206 |
| Comparative Example 5 | 642.5 | 221 |
| Comparative Example 6 | 402.5 | 128 |

As the results shown in Table 1, the coating material formed in the examples of the disclosure have lower content of volatile organic compound (VOC), and the coating material may be maintained as flowable liquid when the weight average molecular weight of the resin composition is larger than 3,000 g/mol. Further, compared to the comparative examples, the coating materials in the examples of the disclosure may have better pull-off strength.

The epoxy oligomer with multifunctional groups (at least three epoxy groups in single molecule) and polyester-polyacid oligomer (at least two carboxylic acid groups in single molecule) are used in the disclosure to copolymerize at a high temperature to produce a branched polymer. The molecule may not be arranged along a single direction or crystallized because of the branched structure. Further, the free volume between the molecules may be increased and the fluidity of the molecules may be enhanced to form flowable liquid epoxy resin with high molecular weight. Such resin may be used to form the epoxy coating material with high molecular weight and low content of volatile organic solvent, and meet the demand of coating material with heat resistance, high viscosity and low volatile organic compound.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A resin composition formed by reacting a polyester-polyacid oligomer with a poly-epoxy oligomer,
   wherein an epoxy group number of the resin composition is between 4 and 10,
   a weight average molecular weight of the resin composition is between 3,000 and 20,000 g/mol,
   a weight average molecular weight of the polyester-polyacid oligomer is between 300 and 850 g/mol, and
   the resin composition is represented by the chemical formula $(C_xH_yO_z)_n$, wherein x is between 38 and 87, y is between 50 and 138, z is between 23 and 141, and n is between 2 and 38.

2. The resin composition according to claim 1, wherein a weight average molecular weight of the poly-epoxy oligomer is between 250 and 700 g/mol.

3. The resin composition according to claim 1, wherein a viscosity of the resin composition is between 2,000 and 70,000 cps.

4. The resin composition according to claim 1, wherein the polyester-polyacid oligomer is formed by reacting a diol, a triol or a combination thereof with an anhydride.

5. The resin composition according to claim 4, wherein the diol or the triol is selected from the group consisting of ethylene glycol, 1,3-propanediol, neopentyl glycol, 1,4-cyclohexanedimethanol, glycerol, and a combination thereof.

6. The resin composition according to claim 4, wherein the anhydride is selected from the group consisting of maleic anhydride, phthalic anhydride, 1,2,4-trimethyl cyclohexane anhydride, pyromellitic dianhydride, and a combination thereof.

7. The resin composition according to claim 1, wherein the poly-epoxy oligomer is selected from the group consisting of trimethylolpropane triglycidyl ether, trimethylolethane triglcidyl ether, glycerol propoxylate triglycidyl ether, 4,4'-Methylenebis (N,N-diglycidylaniline), and a combination thereof.

8. A coating material, comprising:
   1 to 20 wt % of a curing agent; and
   1 to 80 wt % of a resin composition formed by reacting a polyester-polyacid oligomer with a poly-epoxy oligomer,
   wherein an epoxy group number of the resin composition is between 4 and 10,
   a weight average molecular weight of the resin composition is between 3,000 and 20,000 g/mol,
   a weight average molecular weight of the polyester-polyacid oligomer is between 300 and 850 g/mol, and
   the resin composition is represented by the chemical formula $(C_xH_yO_z)_n$, x is between 38 and 87, y is between 50 and 138, z is between 23 and 141, and n is between 2 and 38.

9. The coating material according to claim 8, further comprising:

10 to 40 wt % of a diluent; and 0 to 30 wt % of an organic solvent.

10. The coating material according to claim 9, wherein a content of a volatile organic compound (VOC) of the coating material is less than 300 g/L.

11. The coating material according to claim 8, wherein the resin composition has a pull-off strength of 210 and 500 psi according to ASTM D-4541 Standard Test.

12. The coating material according to claim 8, wherein a viscosity of the resin composition is between 2,000 and 70,000 cps.

13. The coating material according to claim 8, wherein the polyester-polyacid oligomer is formed by reacting a diol, a triol or a combination thereof with an anhydride.

14. The coating material according to claim 13, wherein the diol or the triol is selected from the group consisting of ethylene glycol, 1,3-propanediol, neopentyl glycol, 1,4-cyclohexanedimethanol, glycerol, and a combination thereof.

15. The coating material according to claim 13, wherein the anhydride is selected from the group consisting of maleic anhydride, phthalic anhydride, 1,2,4-trimethyl cyclohexane anhydride, pyromellitic dianhydride, and a combination thereof.

16. The coating material according to claim 8, wherein the poly-epoxy oligomer is selected from the group consisting of trimethylolpropane triglycidyl ether, trimethylolethane triglycidyl ether, glycerol propoxylate triglycidyl ether, 4,4'-Methylenebis (N,N-diglycidylaniline), and a combination thereof.

* * * * *